United States Patent
Hendricks

[11] Patent Number: 6,115,731
[45] Date of Patent: Sep. 5, 2000

[54] SCALABLE OVERFLOW CLAMP AND METHOD FOR A DIGITAL GAIN SCALER/SUMMER

[75] Inventor: Paul D. Hendricks, Whitehall, Pa.

[73] Assignee: Lucent Technologies Inc., Murray Hill, N.J.

[21] Appl. No.: 09/056,722

[22] Filed: Apr. 7, 1998

[51] Int. Cl.[7] ................................................. G06F 7/38
[52] U.S. Cl. ................................................................ 708/552
[58] Field of Search ................................. 708/552, 498

[56] References Cited

U.S. PATENT DOCUMENTS

| | | | |
|---|---|---|---|
| 5,144,308 | 9/1992 | Norsworthy | 341/131 |
| 5,483,238 | 1/1996 | Norsworthy | 341/131 |
| 5,677,860 | 10/1997 | Yazawa et al. | 708/552 |
| 5,847,978 | 12/1998 | Ogura et al. | 708/552 |
| 5,905,662 | 5/1999 | Shiraishi | 708/552 |
| 5,915,109 | 6/1999 | Nakakimura | 708/552 |
| 5,936,870 | 8/1999 | Im | 708/552 |

*Primary Examiner*—David H. Malzahn
*Attorney, Agent, or Firm*—Darby & Darby

[57] ABSTRACT

A scalable overflow clamp for controlling the level of allowable digital signal overflow in a gain scaler/summer having an initial full-scale range and a feedback path for establishing a feedback gain. The clamp includes a range scaler for determining the feedback gain and generating a modified full-scale range relative to the feedback gain. The modified full-scale range defines a substantially constant overflow capability relative to the feedback gain. An overflow detector senses the overflow conditions and a selector responsive to the overflow detector utilizes the modified full-scale range when overflow conditions are sensed.

13 Claims, 11 Drawing Sheets

SCALABLE OVERFLOW CLAMP AND METHOD FOR A DIGITAL GAIN SCALER/SUMMER

FIELD OF THE INVENTION

The invention relates to silicon-based digital signal processing components and methods, and more particularly, digital overflow clamping circuitry and methods for sigma delta based digital gain scaling and summing processing.

BACKGROUND OF THE INVENTION

Intricate signal processing of real world analog signals often requires signal conversion into the digital domain. Conversion makes feasible the use of either conventional digital computers or special purpose digital signal processors. Applications for such processing include wireless communications, such as portable voice, data, and messaging systems that generally employ digital receivers to process transmitted complex high frequency RF signals. The receivers typically acquire the RF analog signals in the gigahertz frequency range and translate the signals to lower intermediate frequencies, or IFs. Thereafter, the low IF signals are digitized and processed through digital signal processing components and techniques.

One technique for achieving high resolution of relatively low frequency signals with lower precision components utilizes oversampling or sigma-delta modulation followed by digital low pass filtering and decimation. Oversampling refers to operation of the modulator at a rate many times above the Nyquist rate, which is typically twice the bandwidth of the sampled analog signal. Modulators of the sigma-delta type are often implemented in high resolution applications because of the ability to shape noise away from the sampled signals. Moreover, sigma-delta modulators offer the distinct advantage of multi-bit resolution with a single bit output.

Normally, digital sigma delta converters are designed with internal bit widths greater than the input signal bit widths. The additional bits are employed to prevent signal overflow from occurring. However, should the input signals approach positive or negative full-scale, the additional overflow bits may be insufficient to prevent overflow. In such circumstances, the internal node is typically clamped at a value of 2N×full-scale to prevent 2's complement wrap-around. Normally, the overflow clamp is implemented by determining if the carry-out of the two most-significant-bits have the same sign.

For signal processing applications utilizing a plurality of sigma delta modulators, the respective outputs may be fed as inputs to a digital scaler/summer. An example of a conventional digital scaler/summer is a derivative of a sigma delta based converter having one or more Pulse Density Modulated (PDM) single bit inputs. The inputs are appropriately scaled by respective values contained in respective N-bit wide input gain registers and added at a first summing node. Feedback signal values of +/−full-scale and +/−twice full-scale are added to the first summing node and a second summing node and scaled by a value contained in an M-bit wide feedback gain register. The gain of the signal is determined by the ratio of the M and N bit register values with a resulting output comprising a single bit PDM composite of the scaled input signals. A digital scaler/summer of this type is disclosed in U.S. Pat. No. 6,023,184, filed Sep. 16, 1997 issued Feb. 8, 2000, entitled "Converter Providing Digital Scaling and Mixing," and U.S. Pat. No. 5.999.114, filed Sep. 16, 1997 issued Dec. 7, 1999, entitled "Dithered Digital Gain Scaler/Summer," both of which are assigned to the assignee of the present invention and are incorporated herein by reference.

In the case of a digital gain scaler/summer, the technique for handling signal overflow is different than that for a typical sigma delta converter. This is because the feedback gain comprises a scalable value, freeing bits to accommodate overflow. Consequently, the number of overflow bits becomes a function of the feedback gain.

While at first glance the variation in overflow for conventional gain scaler/summers appears to add a level of flexibility and efficiency, the variation in the overflow bits can create a latency in the initiation of the clamp on the second integrator. This occurs when the number of bits reserved for overflow approaches the number of bits used to represent the feedback gain value. As a consequence of this latency, the output of the first integrator will follow the overdriven input until the feedback from the clamped output of the second integrator moderates its ascent. Thus, the state of the first integrator's output is a function of the initiation of the clamping on the second integrator's output. When the inputs of the gain scaler/summer return to a non-overdriven state, decaying transients or oscillations appear that are proportional to the output magnitude of the first integrator.

Therefore, what is needed and heretofore unavailable is a scalable overflow clamp for a gain scaler/summer that manages overflow to minimize oscillations as the scaler/summer returns to normal conditions from an overdriven state, by keeping the number of bits reserved for overflow a constant. The scalable overflow clamp and method satisfies this need.

SUMMARY OF THE INVENTION

The scalable overflow clamp and method of the present invention minimizes oscillations in a digital gain scaler/summer resulting from signal overflow conditions. As a result, the performance of the modulator is substantially enhanced in that the modulator is capable of quickly returning to normal operating conditions following signal overflow.

To realize the advantages above, in one form, the invention comprises a scalable overflow clamp for controlling the level of allowable digital signal overflow in a gain scaler/summer having an initial full-scale range and a feedback path for establishing a feedback gain. The clamp includes a range scaler for determining the feedback gain and generating a modified full-scale range relative to the feedback gain. The modified full-scale range defines a substantially constant overflow capability relative to the feedback gain. An overflow detector senses the overflow conditions and a selector responsive to the overflow detector utilizes the modified full-scale range when overflow conditions are sensed.

In another form, the invention comprises a digital gain scaler/summer having an initial full-scale signal range. The gain scaler/summer includes a first integrator having a summing node for collecting at least one input value from at least one input register and a second integrator including a second summing node disposed at the output of the first integrator. A feedback path is coupled to the output of the second integrator and includes respective branches connected to the first and second summing nodes to establish a feedback gain. A scalable overflow clamp is disposed at the output of the second summing node for controlling the level of allowable digital signal overflow. The clamp includes a range scaler for determining the feedback gain and generating a modified full-scale range relative to the feedback gain. The modified full-scale range defines a substantially constant overflow capability relative to the feedback gain. An overflow detector senses the overflow conditions and a selector responsive to the overflow detector utilizes the modified full-scale range when overflow conditions are sensed.

In yet another form, the invention comprises a method for controlling the level of allowable digital signal overflow in a gain scaler/summer. The gain scaler/summer includes a feedback path for establishing a feedback gain at a summing node. The method includes the steps of determining the level of the feedback gain; comparing the summing node output with the scaled overflow value to identify any difference between the output and overflow value; and selecting a scaled value of the full-scale corresponding to the compared difference.

BRIEF DESCRIPTION OF THE DRAWINGS

Other features and advantages of my present invention will be apparent from the following detailed description when read in conjunction with the accompanying drawings, wherein.

DETAILED DESCRIPTION OF THE INVENTION

Figure 1:
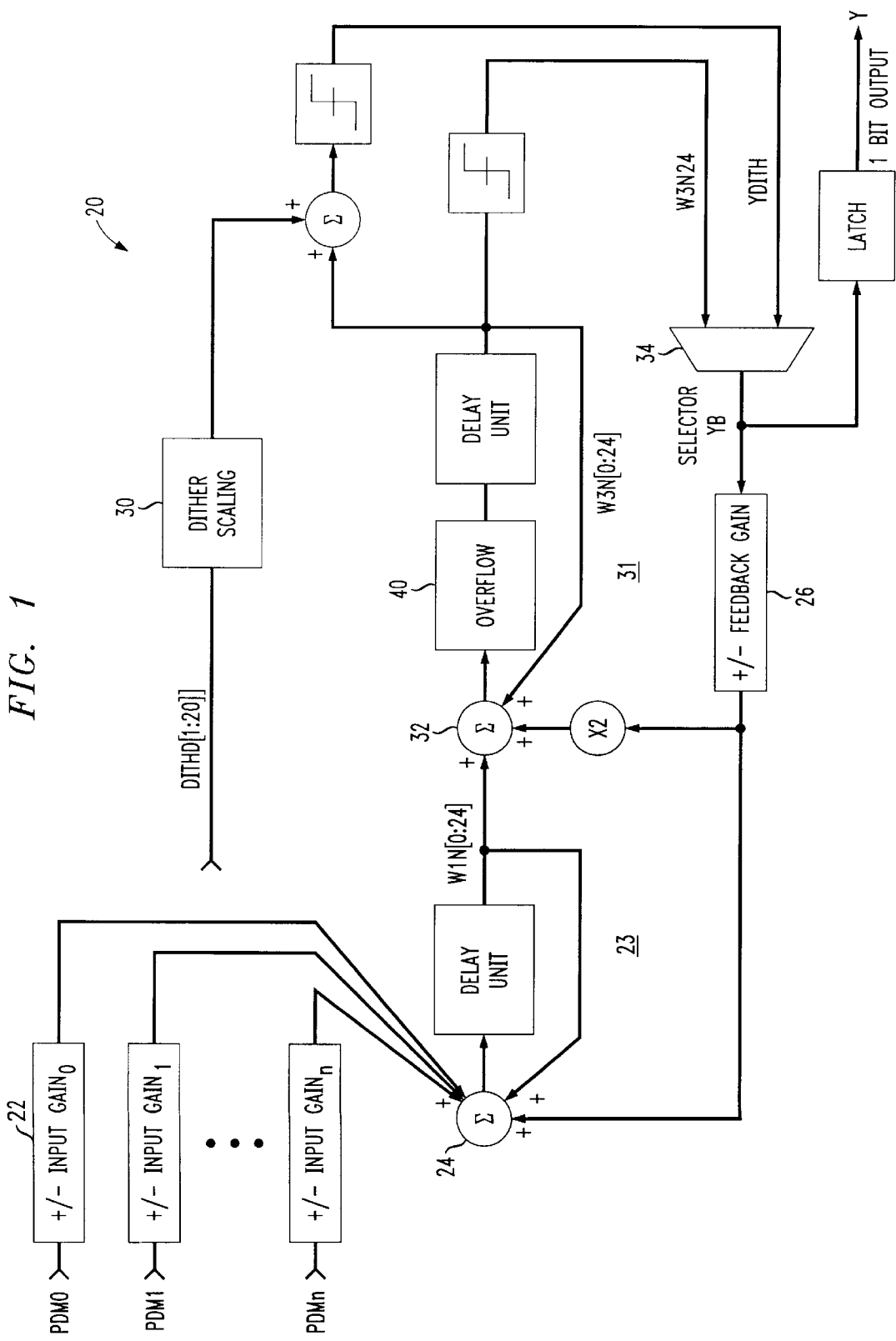
FIG. 1 is a block diagram of a digital gain scaler/summer according to one embodiment of the present invention.
Figure 2:
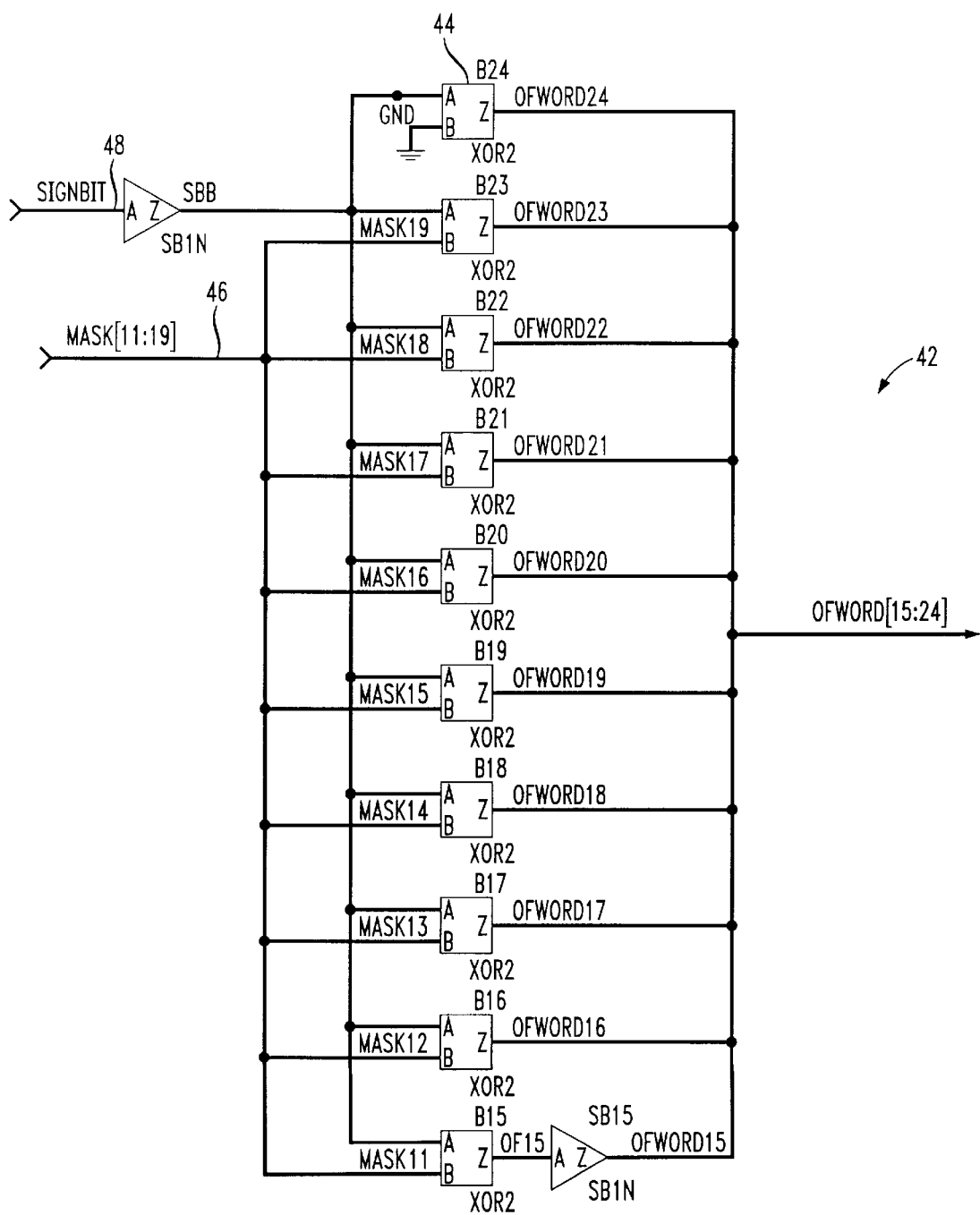
FIG. 2 is a logic diagram of a range scaler circuit according to one embodiment of the present invention.

Referring now to FIG. 1, a PDM digital gain scaler/summer, generally designated 20, mixes and scales a plurality of single bit inputs from respective sigma delta modulators to generate a composite single bit scaled output. The gain scaler/summer employs a scalable overflow clamp 40 to maintain a constant level of signal overflow capability to minimize oscillations in the gain scaler/summer output resulting from overflow recovery.

Further referring to FIG. 1, the gain scaler/summer 20 includes a plurality of input gain registers 22 that include respective 2's complement gain adjustments for the individual input signals. The respective register outputs are fed to a first integrator 23 having a first summing node 24 which sums the register outputs with a feedback gain signal from a feedback gain register 26. The feedback gain register represents the overall gain adjustment for the system. Preferably, these registers are programmed using an internal data bus on the chip. Thus, each individual input channel is scaled by the ratio of the value in its input gain register to that of the value contained in the feedback gain register.

To break up idle channel tones from the incoming analog/digital converters, dithering circuitry is included in the gain scaler/summer 20. The dither includes dither scaling logic 30 for processing a pseudo random multi-bit signal DITHD and added to a second integrator 31 at a second summing node output 32. A selector 34 receives both the dithered output and the direct output from the second summing node and passes one of the signals through to the feedback gain register 26. Additional features of the PDM gain scaler/summer are more fully described in U.S. Pat. No. 6,023,184, entitled "Converter Providing Digital Scaling and Mixing," and U.S. Pat. No. 5,999,114,entitled "Dithered Digital Gain Scaler/Summer," both of which are assigned to the assignee of the present invention and are incorporated herein by reference.

Referring now to FIGS. 1, 2, 3A and 3B, the scalable overflow clamp 40 according to the present invention couples to the output of the second summing node 32 and includes a range scaler 42 (FIG. 2) and an overflow detector 50. The range scaler includes a plurality of XOR logic elements 44 that receive respective mask and signbit inputs 46 and 48. The mask bits MASK[0:19] are created from the feedback gain register value and include zero's above the position of the most significant "1" in the feedback gain value and "1's" in all other bit positions. The respective outputs of the XOR logic elements form an overflow word OF[0:24] of a predetermined number of bits to generate a scaled version of positive or negative full-scale.

Figure 3A:
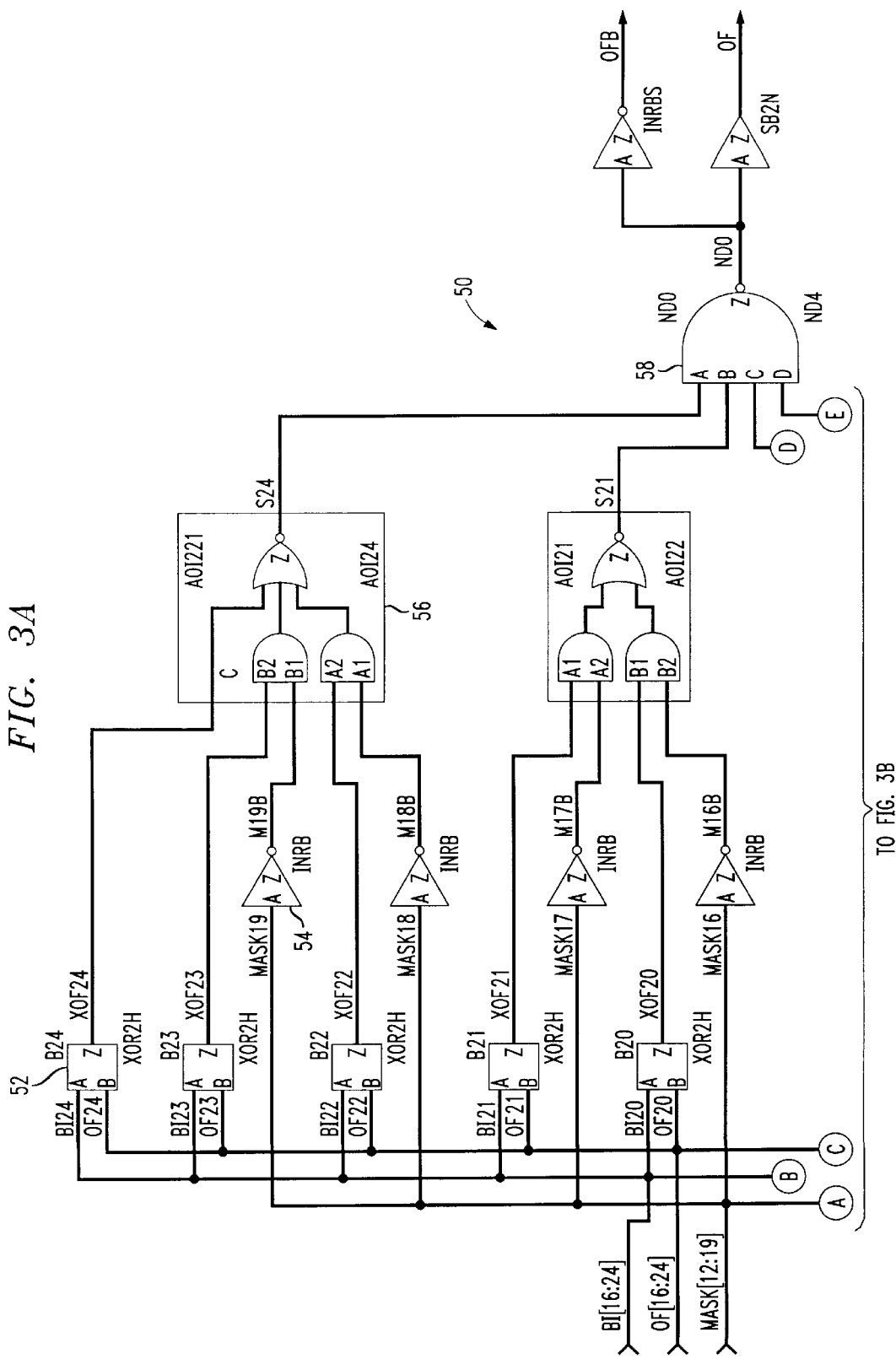
FIG. 3A is a logic diagram of an overflow detector circuit according to one embodiment of the present invention.
Figure 3B:
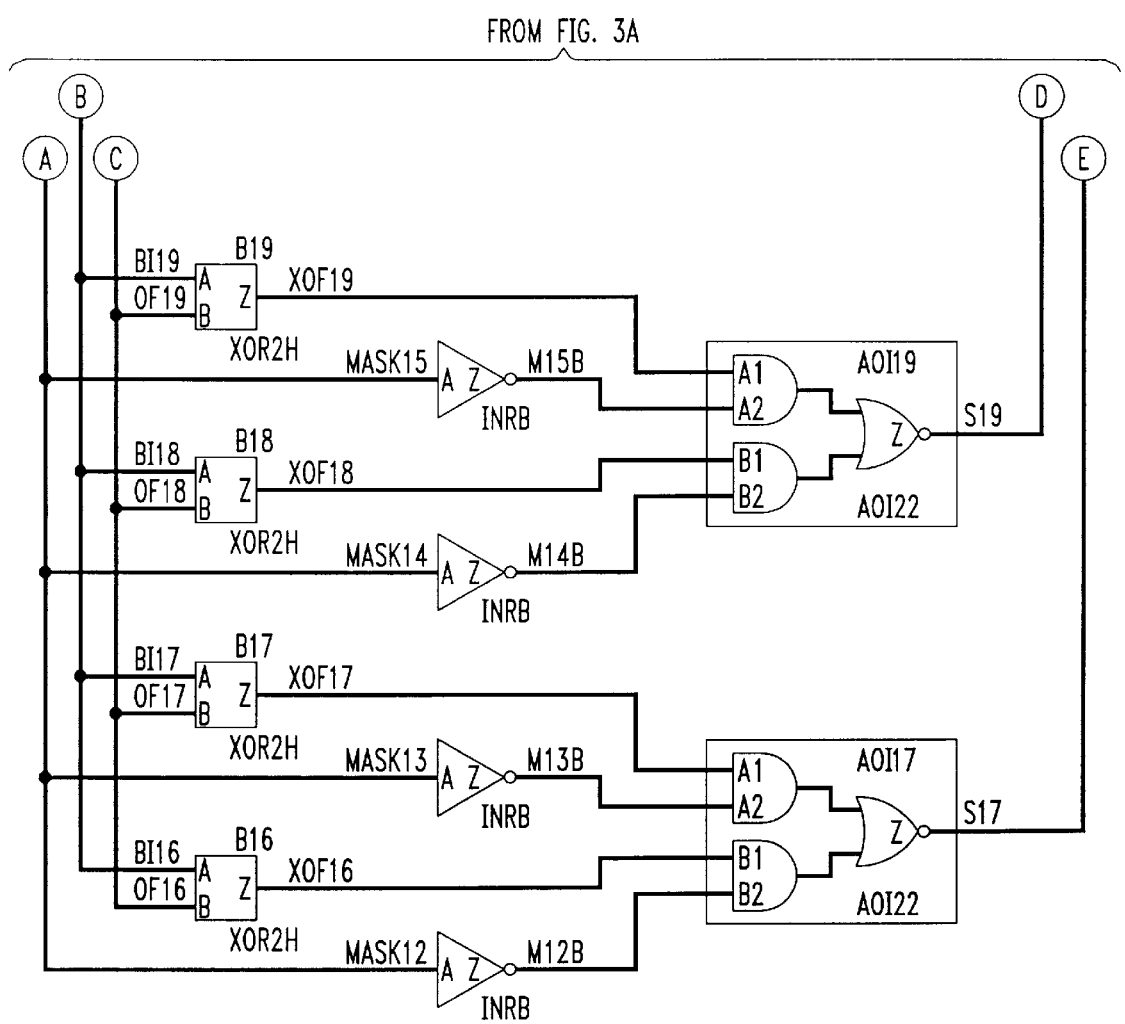
FIG. 3B is a continuation of the logic diagram of FIG. 3A.

Referring now to FIG. 3A, the overflow detector 50 includes logic that utilizes the shift M-bit MASK[0:19] to compare the upper bits of the second summing node output with corresponding bits representing the scaled overflow value. A plurality of "exclusive-or" elements 52 receive the respective 16–24 bits from respective BI and OF words as inputs to generate respective output bits 16–24 of word XOF. A plurality of AND/NOR modules 56 cooperate with a NAND gate 58 for selecting the respective XOF bits by the mask value bits 12–19. If any of the XOF bits selected by the mask bits 12–19 are at a "one" state, then the output of the NAND generates a single bit output signal OF and an inverted output signal OFB. Signals OFB and OF drive a selector that selects either the overflow value or the output of the second summing node 32.

In operation, the range scaler 42 continuously generates a scaled version of the positive or negative full-scale signal range. This is done by the XOR 44 of the twenty-bit mask created from the feedback gain value with that of the sign bit of the second summing node output 32. The result is then shifted upward by five bit positions. For example, if the sign bit is a "one" indicating a negative value, and the mask created from the feedback gain value is four "zeros" followed by sixteen "ones", then the twenty-five-bit full-scale value becomes four "ones" (i.e. the sign bit is extended) followed by twenty-one "zeros." Similarly, if the sign bit of the second summing node output 32 is a "zero" and the twenty bit mask created from a new feedback gain value is six "zeros" followed by fourteen "ones", then the resulting scaled full-scale value is now six "zeros" with the remaining least-significant-bits all "ones." The five bit shift allows for a constant factor relative to feedback gain value in order to accommodate overflow.

The sign-bit resulting from the summation at the second summing node 32 determines whether positive or negative full-scale is generated. By generating a scaled version of the positive or negative full-scale signal range, the level of overflow may be effectively controlled. This is important because I have discovered undesirable oscillatory effects associated with unchecked levels of signal overflow. Table I below illustrates a representative example of the appropriate scaled full-scale depending on the feedback gain range.

TABLE I

| Feedback Gain Range | Second Integrator Clamp Value |
|---|---|
| 3072 to 4095 | +/−65536 |
| 4096 to 8191 | +/−131072 |
| 8192 to 16383 | +/−262144 |
| 16384 to 32767 | +/−524288 |
| 32768 to 65535 | +/−1048576 |
| 65536 to 131071 | +/−2097152 |
| 131072 to 262143 | +/−4194304 |
| 262144 to 524287 | +/−8388608 |
| 524288 to 649264 | +/−16777216 |

From Table I, it can be seen that a constant 5 bits of overflow are added to accommodate each range of values for the feedback gain without incurring oscillatory effects.

Although the range scaler 42 continuously generates a scaled version of the positive or negative full-scale signal range, the scaled version is utilized only when the gain scaler/summer experiences overflow conditions. This is conveniently determined through operation of the overflow detector 50.

Referring to FIG. 3, the overflow detector 50 works by comparing the sign bits of the scaled positive or negative full-scale value with that of the sign bits of the output from the second summing node 32. If all of the bits used to represent the sign in the second summing node output are the same as the sign bits used in the scaled version of positive or negative full-scale, then no overflow has occurred and the output passed through the overflow detector is the value of the second summing node 32. Conversely, if some of the bits used to represent the sign of the second summing node output are different from the sign bits in the scaled full-scale value, then overflow has occurred and the output of the overflow detector is the scaled full-scale value.

Further referring to FIG. 3, more specifically, the overflow detector 50 operates by first taking the XOR of the sign bits used in the scaled version of full-scale with that of the sign bits of the output of the summing node 32. Any difference in sign bits between the two values will result in an output of "one." Since only the bits representing the sign bit positions are to be compared between the two values, the negated version of the feedback gain mask is used to select those bits. This is done by simply taking the AND of the mask with the result of the XOR output. If any of these outputs result in a "one", then the output OF is set to a one. This is tantamount to taking the OR of each of these outputs. The AND/NOR modules 56 and the NAND gate 58 carry out the foregoing AND/OR operation. The signals OF and OFB control a selector, which selects between the pregenerated scaled overflow value or the output of the second summing node 32. Thus, when OF is a one, indicating overflow, the output of the overflow detector is the scaled overflow value.

Figure 4:
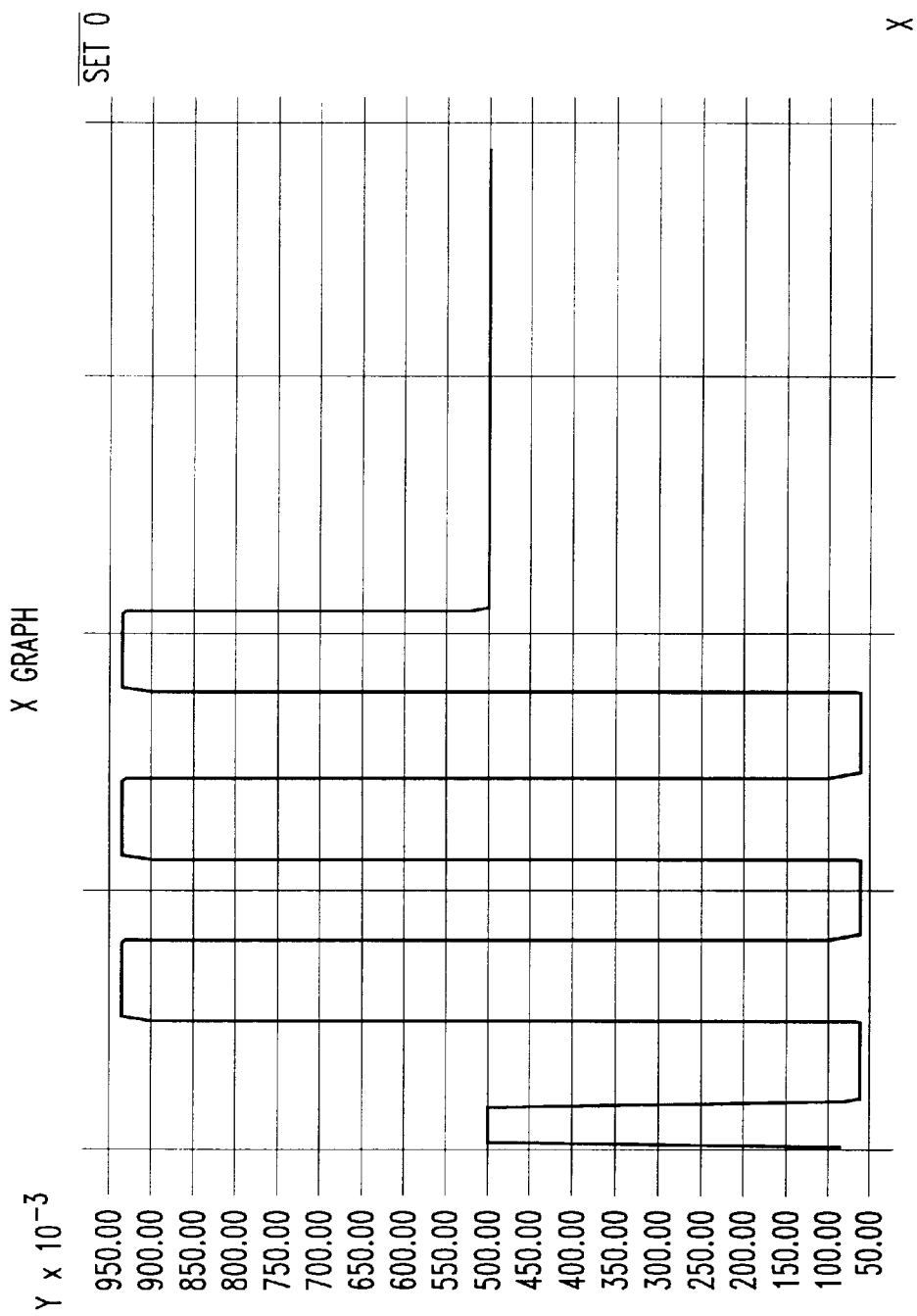
FIG. 4 is a graphical representation of a Pulse Density Modulated input.
Figure 5:
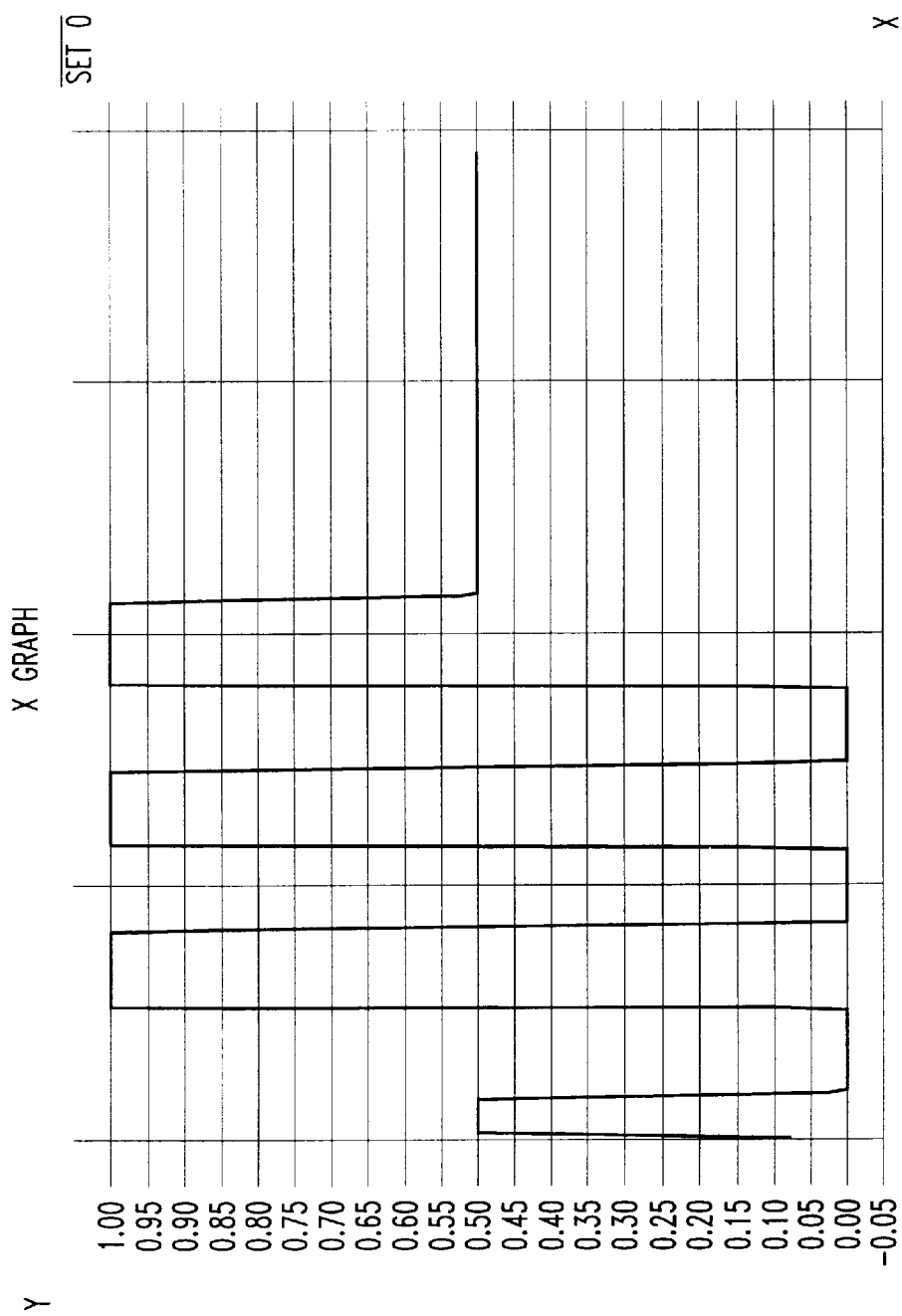
FIG. 5 is a graphical representation of a single bit output utilizing the present invention with the input of FIG. 4.

Examples of the effect of the scalable clamp 40 of the present invention are illustrated graphically in FIGS. 4 through 10. FIG. 4 shows an input PDM input of +/−0.875 and including a feedback gain of 3072 (13 bits including the sign-bit) and an input gain of 2048 (13 bits including the sign-bit). The resulting gain is ⅝. With this same square-wave signal driving two of seven input channels, the overall gain of the composite signal is 1.09375 to overdrive the system. The resulting single bit output is shown in FIG. 5 when the overflow clamp is set to seventeen (+/−65536) bits.

Figure 6:
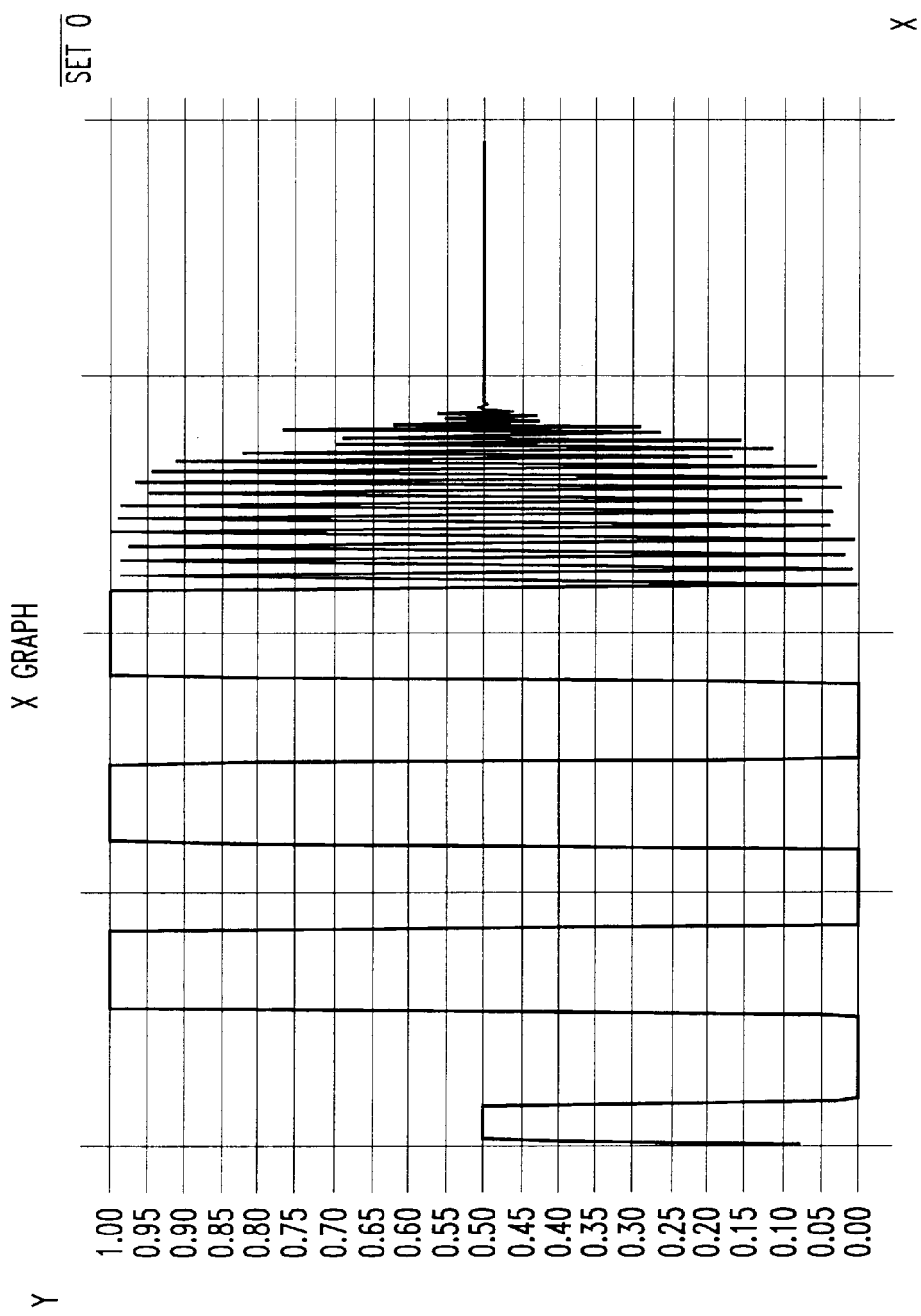
FIG. 6 is a graphical representation similar to FIG. 5 without employing the present invention.
Figure 7:
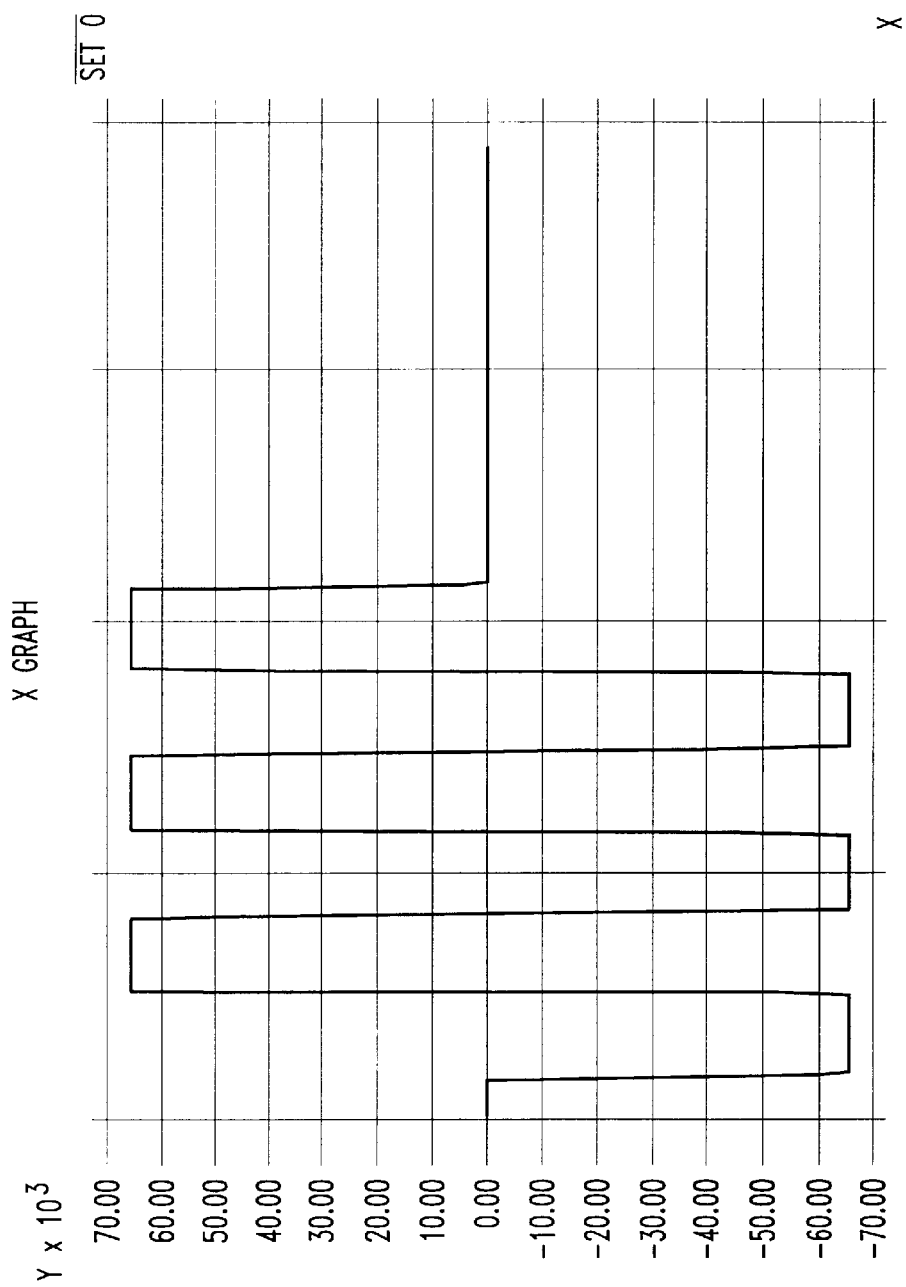
FIG. 7 is a graphical representation of the second integrator output associated with the single bit output of FIG. 5.

Noticeably absent from the output signal of FIG. 5 are any ringing effects or overshoots when the input returns to zero (halfway between negative and positive full-scale). In contrast, FIG. 6 illustrates the single bit output corresponding to the input conditions of FIG. 4 when the overflow clamp is set to twenty-five bits (+/−16777216). Decaying oscillations occur after the input overload is removed and the overflow clamp set to twenty-five bits.

Figure 8:
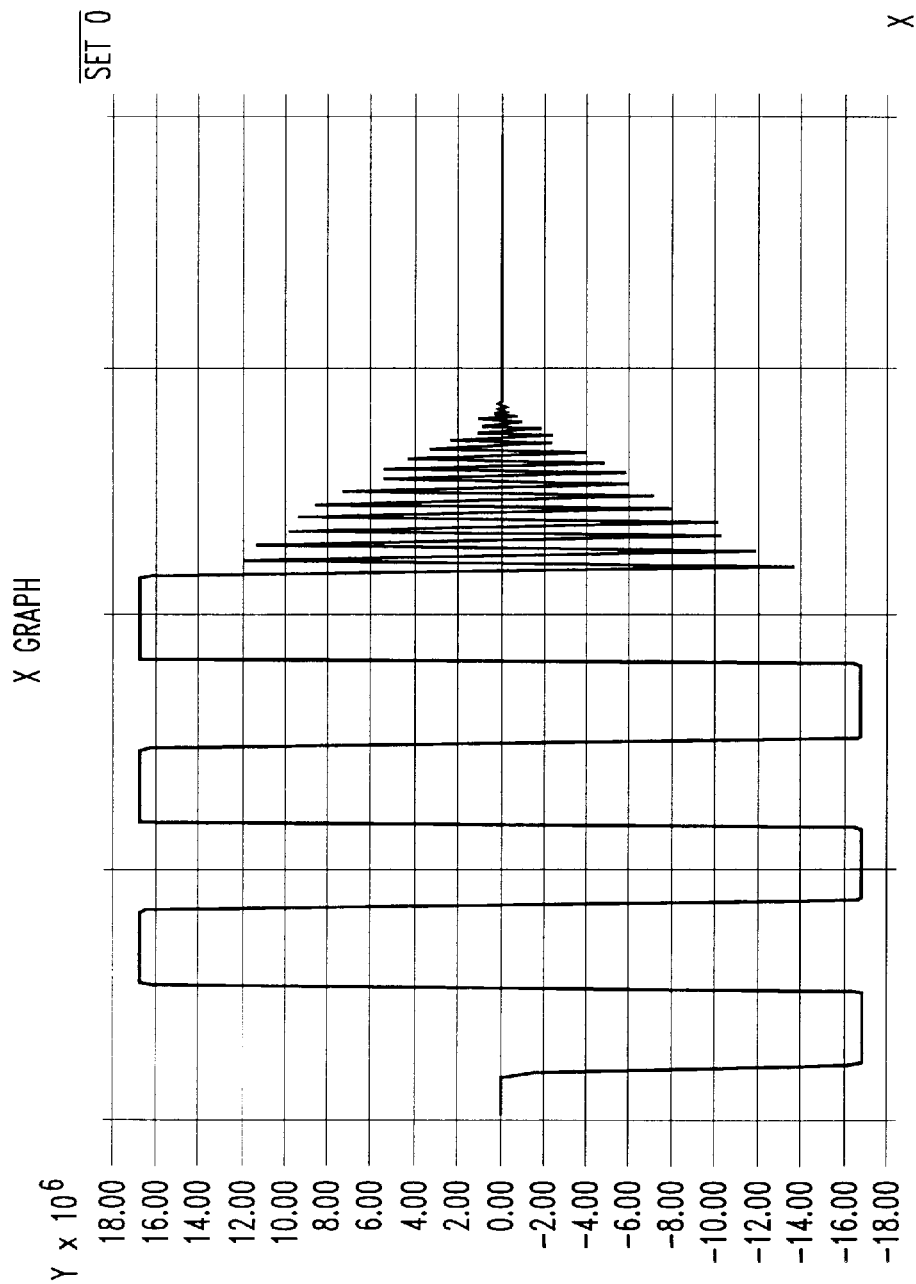
FIG. 8 is a graphical representation of the second integrator output associated with the single bit output of FIG. 6.
Figure 9:
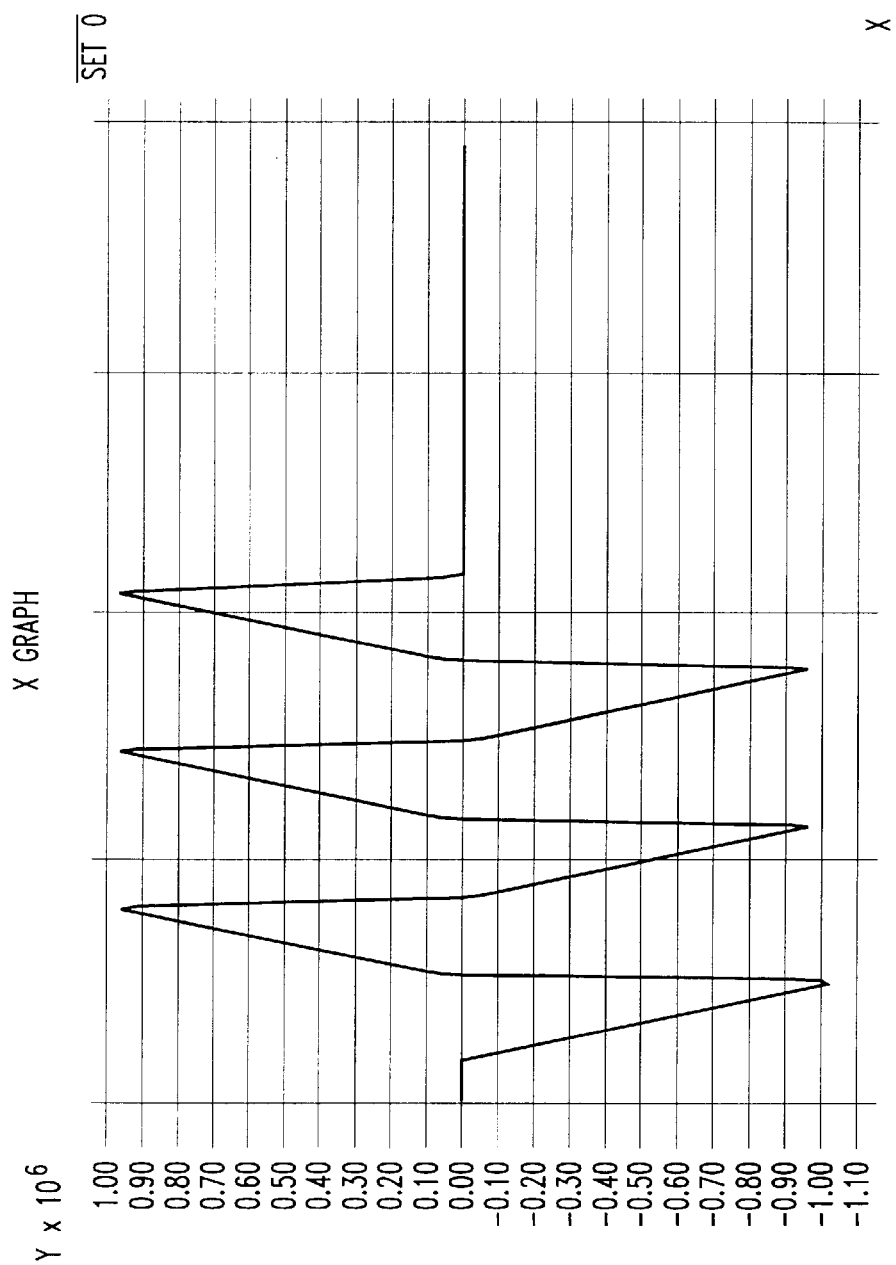
FIG. 9 is a graphical representation of the first integrator output associated with the single bit output of FIG. 5.
Figure 10:
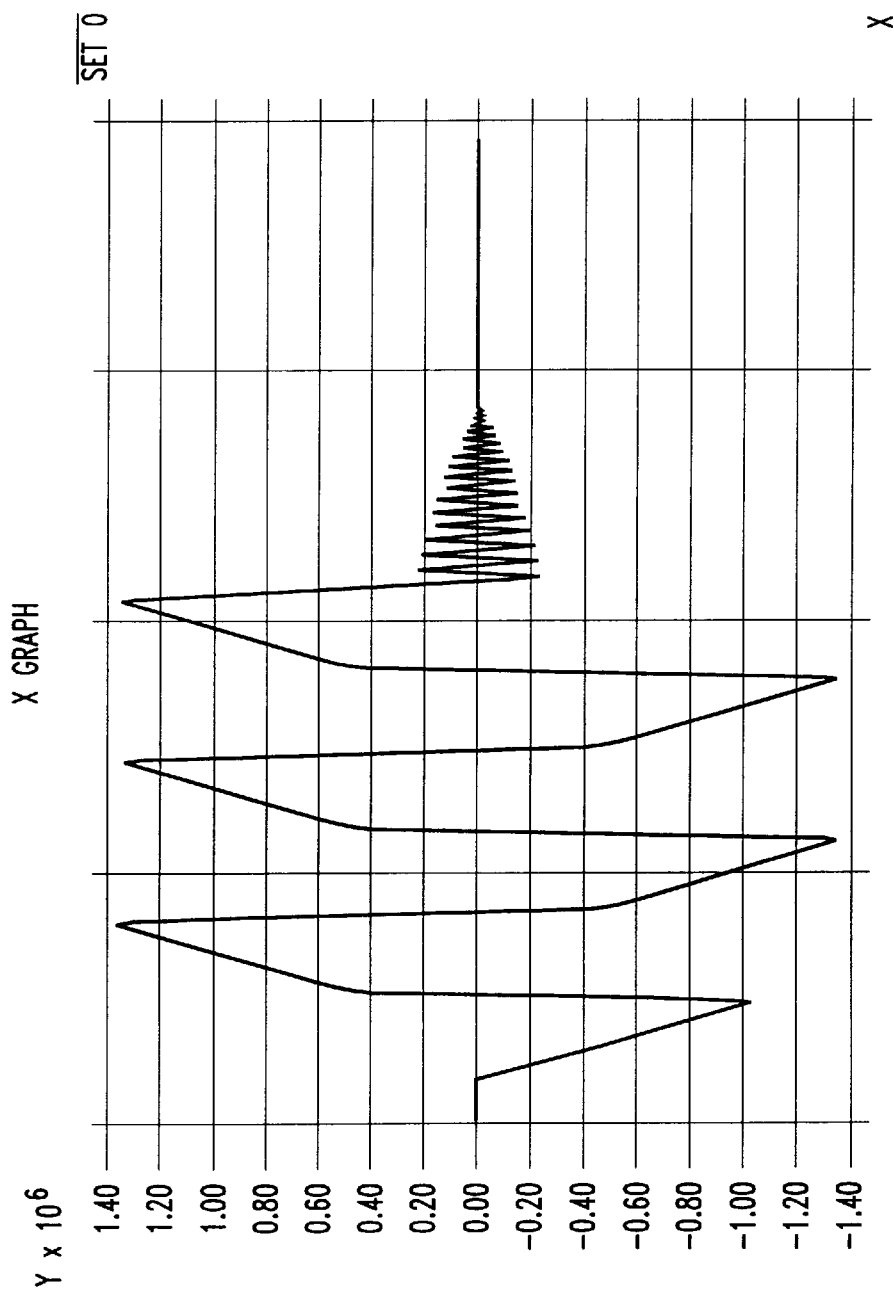
FIG. 10 is a graphical representation of the first integrator output associated with the single bit output of FIG. 6.

The respective output of the second integrator 31 is shown with the output being clamped at seventeen bits (FIG. 7) and twenty-five bits (FIG. 8). The outputs for the first integrator 23 are shown in FIGS. 9 and 10. When the output clamp on the second integrator is set at twenty-five bits (FIG. 10), the output of the first integrator continues to increase until the feedback resulting from the output of the second integrator slows its ascent. Thus the delay in the clamping action on the second integrator allows the output of the first integrator to reach an overdriven state. Since the feedback at the first summing node only slows the ascent of the first integrators' output when the output of the second integrator is clamped, the output of the first integrator can exceed the dynamic range of the system if the inputs continue to overdrive the system. As a result the output of the first integrator is clamped at the maximum value allowed for the system (M+K bits) in order to prevent 2's complement wrap around.

Those skilled in the art will recognize the many benefits and advantages afforded the present invention. Of significant importance is the feature of scalably clamping the positive or negative full-scale signal at the second summing node output to control the amount of allowable signal overflow in the system. By maintaining a constant level of signal overflow, oscillations in the system output are substantially minimized.

While the invention has been particularly shown and described with reference to the preferred embodiments thereof, it will be understood by those skilled in the art that various changes in form and detail may be made therein without departing from the spirit and scope of the invention.

What is claimed is:

1. A scalable overflow clamp for controlling the level of allowable digital signal overflow in a gain scaler/summer, said gain scaler/summer having an initial fill-scale range and a feedback gain, said clamp including:

a range scaler for determining said feedback gain and generating a modified full-scale range relative to said feedback gain, said modified full-scale range defining a substantially constant overflow capability relative to said feedback gain;

an overflow detector for sensing an overflow condition; and a selector responsive to said overflow detector for utilizing said modified full-scale range when said overflow condition is sensed.

2. A scalable overflow clamp according to claim 1 wherein:

said feedback gain is represented by a plurality of bits cooperating to define a mask; and said range scaler comprises a plurality of XOR logic elements to receive said respective mask bits and generate said modified full-scale range.

3. A scalable overflow clamp according to claim 2 wherein:

said mask bits comprise zero's above the position of the most significant "1" in the feedback gain value and one's in all other bit positions.

4. A scalable overflow clamp according to claim 3 wherein said overflow detector includes respective inputs to receive said respective mask bits and a scaled overflow; said overflow detector further including a comparator to determine any differences between said mask bits and said scaled overflow bits to detect overflow.

5. A scalable overflow clamp according to claim 1 wherein:

said constant level of overflow comprises five bits.

6. A digital gain scaler/summer having an initial full-scale signal range, said gain scaler/summer including:

a first integrator having a summing node for collecting at least one input value from at least one input register;

a second integrator including a second summing node disposed at the output of said first integrator;

a feedback gain register coupled to the output of said second integrator and having respective branches connected to said first and second summing nodes for establishing a feedback gain; and a scalable overflow clamp disposed at the output of said second summing node for controlling the level of allowable digital signal overflow in said gain scaler/summer, said clamp including:

a range scaler for determining said feedback gain and generating a modified full-scale range relative to said feedback gain, said modified full-scale range defining a substantially constant overflow capability relative to said feedback gain;

an overflow detector for sensing an overflow condition; and a selector responsive to said overflow detector for utilizing said modified full-scale range when said overflow condition is sensed.

7. A scalable overflow clamp according to claim 6 wherein:

said feedback gain is represented by a plurality of bits cooperating to define a mask; and said range scaler comprises a plurality of XOR logic elements to receive said respective mask bits and generate said modified full-scale range.

8. A scalable overflow clamp according to claim 7 wherein:

said mask bits comprise zero's above the position of the most significant "1" in the feedback gain value and one's in all other bit positions.

9. A scalable overflow clamp according to claim 8 wherein said overflow detector includes respective inputs to receive said respective mask bits and a scaled overflow; said overflow detector further including a comparator to determine any differences between said mask bits and said scaled overflow bits to detect overflow.

10. A scalable overflow clamp according to claim 6 wherein:

said constant level of overflow comprises five bits.

11. A method for controlling the level of allowable digital signal overflow in a gain scaler/summer, said gain scaler/summer including a feedback gain connected to a summing node, said method including the steps of:

determining a modified full-scale range and a corresponding overflow value;

comparing said summing node output with said overflow value to identify any difference there between said difference identifying an overflow condition; and selecting said modified full-scale range when said overflow condition is identified.

12. A method according to claim 11 wherein said step of determining includes the steps of:

selecting a range scaler having logic for identifying said feedback gain; and generating said modified fill-scale range with said range scaler relative to said feedback gain, said modified full-scale range defining a substantially constant overflow capability relative to said feedback gain.

13. A method according to claim 12 wherein said comparing step includes the steps of:

representing said feedback gain as a plurality of bits defining a mask, said mask bits comprise zero's above the position of the most significant "1" in the feedback gain value and one's in all other bit positions;

receiving said mask bits and said summing node output; and identifying differences between said respective mask and output bits.

* * * * *